(12) United States Patent
Brothers

(10) Patent No.: US 6,870,474 B1
(45) Date of Patent: Mar. 22, 2005

(54) VEHICLE SAFETY SIGNALING SYSTEM

(76) Inventor: Budd Brothers, 3857 Fairway Dr., Canfield, OH (US) 44406

( * ) Notice: Subject to any disclaimer, the term of this patent is extended or adjusted under 35 U.S.C. 154(b) by 23 days.

(21) Appl. No.: 10/302,700

(22) Filed: Nov. 25, 2002

(51) Int. Cl.$^7$ .................................................. B60Q 1/26
(52) U.S. Cl. ........................ 340/468; 340/467; 340/479; 340/441; 340/466; 340/472
(58) Field of Search ................................. 340/468, 467, 340/479, 441, 466, 472, 66, 72

(56) References Cited

U.S. PATENT DOCUMENTS

| | | | |
|---|---|---|---|
| 3,774,152 A | * | 11/1973 | Tandy ........................ 340/464 |
| 3,787,808 A | | 1/1974 | Knopf |
| 3,949,361 A | | 4/1976 | Replogle |
| 4,034,338 A | | 7/1977 | Bevilacqua |
| 4,491,824 A | | 1/1985 | Chiou |
| 5,164,701 A | | 11/1992 | Nan-Mu et al. |
| 5,856,793 A | * | 1/1999 | Tonkin et al. ............... 340/903 |
| 6,132,072 A | * | 10/2000 | Turnbull et al. ............ 362/494 |
| 6,163,256 A | * | 12/2000 | Brown ........................ 340/479 |

* cited by examiner

*Primary Examiner*—Hung Nguyen
(74) *Attorney, Agent, or Firm*—Harpman & Harpman

(57) ABSTRACT

A signaling system for vehicle's to indicate changes in vehicle's speed during acceleration and deceleration as well as relative constant speed conditions to following motorists. A light signaling display is mounted on the rear of the vehicle and is illuminated by multiple light assemblies, some of which have lamps of the three primary colors. A controller determines illumination sequence and intensity depending on input from sensors on the vehicle's speed controls and a pre-programmed set of illumination patterns.

6 Claims, 3 Drawing Sheets

VEHICLE SAFETY SIGNALING SYSTEM

BACKGROUND OF THE INVENTION

1. Technical Field

This invention relates to visual safety signaling systems for automobiles and the like. Such systems generate a warning light to inform following vehicles of the relative status of the vehicle dependent on acceleration, braking and constant speed conditions.

2. Description of Prior Art

Prior art devices of this type have provided a variety of lighting control systems that provide a visual warning to following motorist on the condition of the vehicle ahead, see for example U.S. Pat. Nos. 3,787,808, 3,949,361, 4,034,338, 4,491,824 and 5,164,701.

In U.S. Pat. No. 3,787,808 an auto signaling system is disclosed that provides a multiple segmented illumination display with warning indicia thereon. An electronic control circuit activates the individual portions of the display in response to operator control input and the actual speed of the vehicle.

U.S. Pat. No. 3,949,361 is directed to a signaling system that uses a specific color light illumination sequence to indicate the control input of the operator. A green light is illuminated during acceleration and an amber light when no action is detected and a red light during stopping. A turn signal indication is also provided using a combination of lights.

U.S. Pat. No. 4.034,338 sets forth a signaling light for vehicles that indicates the operative condition of the vehicle to another motorist. The system has three warning lights that are activated upon operator input for acceleration and deceleration.

U.S. Pat. No. 4,491,824 claims a safety indicator for a vehicle that shows its actual status by colored lamps mounted on the front and back of the vehicles. A speed sensitive means and switches on the brake and accelerator pedals control the lighting signals.

U.S. Pat. No. 5,164,701 discloses a car operation condition indicator device that has multiple red, white and green warning lights on the front and rear portions of the vehicle. Red lights flashing indicate that the car is stopped or backing up for example.

SUMMARY OF THE INVENTION

A vehicle status lighting system that responds to change in vehicle motion dependent on operator input for acceleration and deceleration. Three primary color lights are combined together to make different color intensities and colors to impart distinctive warning indications dependent on predetermined coded sequence. Three distinctive illumination areas are activated to advise the following motorists of the status of the subject vehicle.

DESCRIPTION OF THE PREFERRED EMBODIMENT

Figure 1:
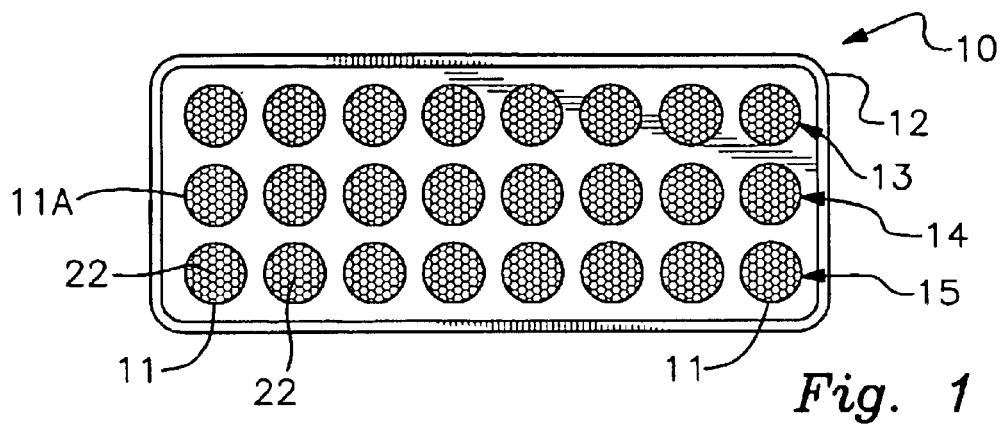
FIG. 1 is a front elevational view of the vehicle safety light array of the invention with portions broken away.
Figure 2:
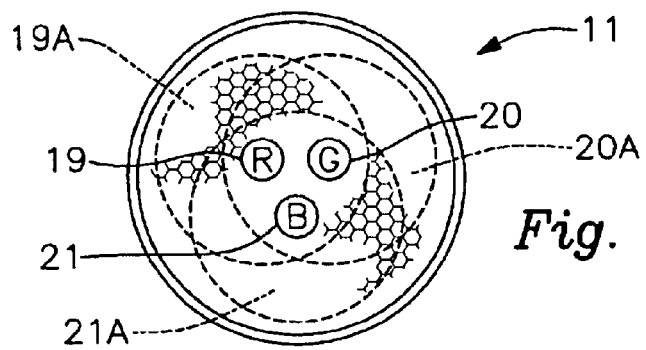
FIG. 2 is a graphic representation of the primary illumination arrangement of the individual lighting assemblies.

Referring to FIG. 1 of the drawings, a vehicle safety lighting display 10 can be seen having a plurality of lighting assemblies 11 positioned within a mounting frame 12. The lighting assemblies 11 and 11A are arranged in parallel rows 13, 14 and 15 designating three primary signaling areas. In this example, the lighting assemblies 11 and 11A are aligned both horizontally and vertically in relation to their respective rows 13, 14 and 15. Each of the lighting assemblies 11 have three independent lamps 19, 20 and 21, each of which are of a primary color well known in the respective lamps as red, green and blue as seen in FIG. 2 of the drawings.

Each of the lamps 19–21 are graphically illustrated indicating three light projection patterns 19A, 20A and 21A shown in broken lines. The lamps 1921 are grouped together so as to provide overlapping of the respective projection paths 19A–21A onto a projection diffusion lens 22. Such diffusion lenses 22 are well known within the art having multiple light diffusion surface areas arranged to disburse concentrated impinging light rays to a disbursed pattern. Such diffusion lenses 22 are preferably made of molded synthetic resin material.

Figure 3:
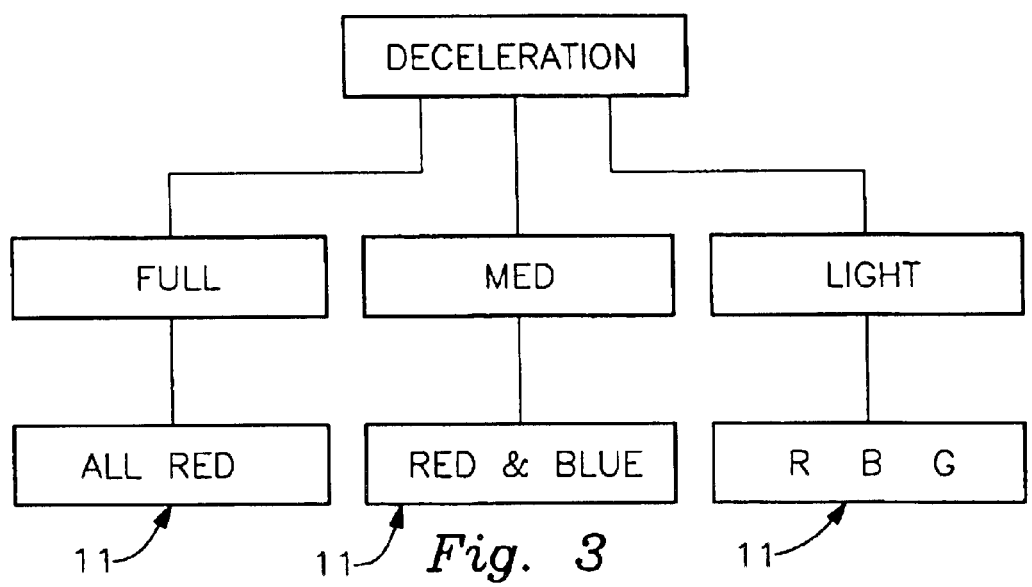
FIG. 3 is a block flow diagram of the illumination sequence under braking for the respective lighting assemblies.
Figure 4:
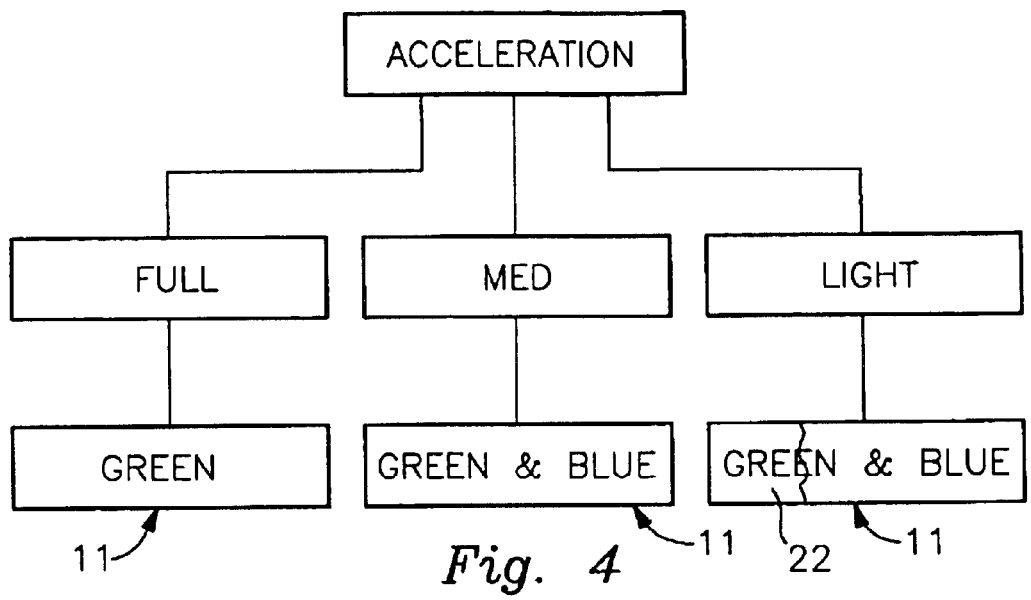
FIG. 4 is a block flow diagram of the illumination sequence of the lighting assemblies under acceleration.
Figure 5:
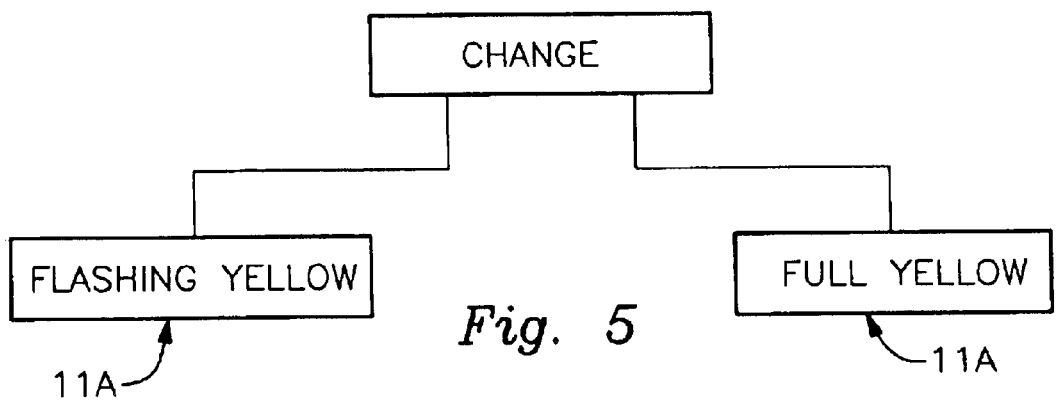
FIG. 5 is a block flow diagram of the illumination sequence of the lighting assemblies during a change in vehicle status.
Figure 6:
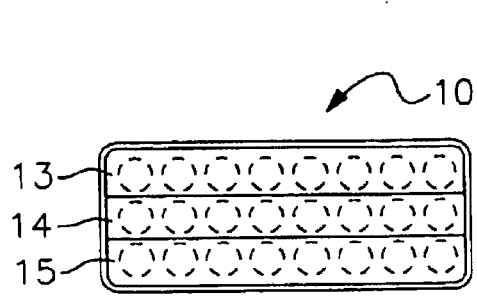
FIG. 6 is a graphic representation of the multiple lighting assemblies signaling orientation relative to each other with the lighting array.
Figure 7:
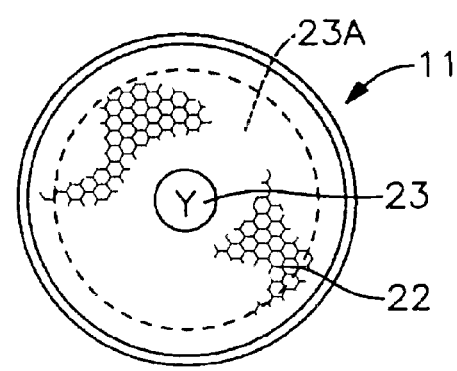
FIG. 7 is a graphic representation of a signal lamp lighting assembly within the lighting array.

Referring now to FIGS. 3–5 of the drawings, control circuits 23 are illustrated as block flow diagrams. A vehicle braking sequence can be seen in FIG. 3 of the drawings in which the braking input (deceleration) is characterized as full braking (FULL), medium braking (MED), and light braking (LIGHT). As seen upon full braking (FULL) a row of lighting assemblies 11 illustrated as row 13, with the primary red lamp 19 being activated only.

Upon medium braking (MED), the red lamp 19 and a blue lamp 21, for example, within each assembly is illuminated imparting a diminished red intensity as seen through the diffusion lens 22.

When light braking (LIGHT) is to be indicated the red lamp 19 and a green lamp 20 within each of the lighting assemblies 11 are illuminated to provide a distinctive green hued illumination effect by the diffuser lens 22. It will be apparent to those skilled within the art that other illumination combinations can be achieved to create representative lighting to correspond to other actions of the vehicle such as acceleration as seen in FIG. 4 of the drawings. In this example under full or maximum acceleration only the green lamp 20 in each of the lighting assemblies 11 are activated in their respective row 15. As acceleration input is decreased, (MED) blue lamps 21 are illuminated in combination with the green lamps 20 in each of the lighting assemblies 11. Under light acceleration (LIGHT) only a proportional amount i.e. 25% of the green lamps 20 and blue lamps 21 are activated for a reduced lighting output as well as color purity as can be seen as indicated at 22 in FIG. 4 of the drawings.

Any change in acceleration to deceleration or braking is indicated by rapid flashing of yellow lamps 23 in multiple lighting assemblies 11A in lamp row 14 of the display, then changing to a continuous yellow lamp (FULL YELLOW) illumination. The utilization of flashing and continuous illumination of the lamps 22B in the respective light assemblies 11A will indicate that some change in the vehicle status is about to occur.

It will thus be evident that providing multiple distinctive illumination displays that the safety lighting display 10 of the invention will aid drivers of following vehicles (not shown) in understanding what is taking place in the vehicle equipped with the safety lighting display and therefore will be able to respond in a more timely and safe fashion to changes in the vehicle's relative position imparted by changes in speed in response to driver's input.

The lighting arrays 11 and 11A are powered by the vehicle's electrical system and as described are activated by the relative control inputs under acceleration, braking and changes there between as described hereinafter.

Figure 8:
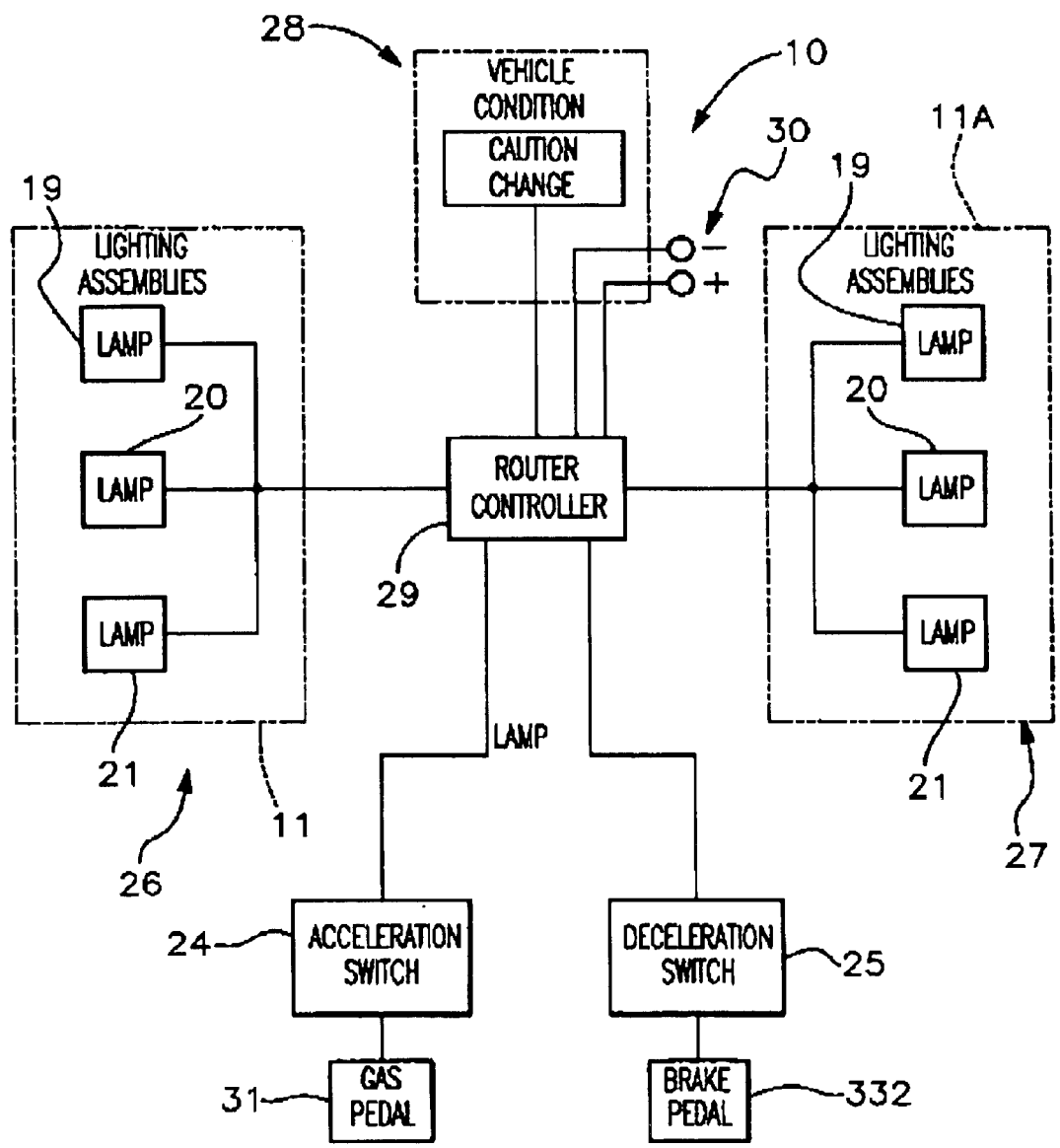
FIG. 8 is block flow control sequence diagram of the selective illumination paths dependent on operator input.

Referring now to FIG. 8 of the drawings, a block flow control diagram illustrates the electrical flow control of the system in which electrical controlled inputs by a acceleration pressure control switch 24 and a deceleration pressure control switch 25. The respective lighting assemblies 11 and 11A are illustrated for the acceleration display at 26 and the deceleration display at 27. A lighting assembly for caution or change in vehicle condition is illustrated at 28.

Accordingly, it will be seen that a router/controller 29 is powered by the vehicle's electrical system 30. Each of the pressure control switches 24 and 25 react under manual input from a gas pedal 31 and brake pedal 32 respectively so as to respond to changes in physical input and thus corresponding speed of the vehicle. The router/controller 29 provides appropriate line output to individual lighting assemblies 11 and 11A and their respective lamp configurations as hereinbefore described. The router/controller 29 acts as a relay therefore to provide power to the specific lamps 19–21 and 23 in each of the respective lighting assemblies as previously described.

In absence of any input from the respective pressure control switches 24 and 25 a default activation for the yellow lamps 23 occurs by the router/controller to flashing and then after a time sequence to a constant yellow (FULL) illumination is achieved.

It will thus be seen that a new and novel vehicle safety signaling system has been illustrated and described and it will be apparent to those skilled in the art that various changes and modifications may be made thereto without departing from the spirit of the invention.

Therefore I claim:

1. An automotive vehicle safety signaling light system comprising,
    a plurality of lighting assemblies arranged in aligned orientation to one another,
    said assemblies comprises, multiple distinguishable color electric lamps,
    said lamps arranged for overlapping illumination pattern to one another to define a new non-lamp distinguishable color,
    a diffuser lens in spaced overlapping aligned relation to said respective lamps,
    a router/controller in communication with said respective lamps in each lighting assembly,
    pressure responsive electrical switches in connection with said router controller for energizing at least one lamp in each assembly,
    said pressure responsive electrical switches adapted for linear progressive input in relation to vehicle control pedals position and input,
    selective simultaneous illumination of multiple lamps within each of said lighting assemblies simultaneously, means for powering said router controller and respective lighting assemblies, and means for selective illumination of some of said lighting assemblies responsive to nonlinear input from said respective pressure responsive switches and wherein some of said lamps illuminate at less than that of said remaining lamps within each said light assembly.

2. The automotive vehicle safety signaling light system set forth in claim 1 wherein said lighting assemblies combine to define multiple rows of distinguishable illumination.

3. The automotive vehicle safety signaling system set forth in claim 1 wherein said selective sequential illumination of multiple lamps in some of said lighting assemblies are responsive to said pressure responsive switches linear progressive output.

4. The automotive vehicle safety signaling system set forth in claim 1 wherein said means for powering said router/controller and respective lighting assemblies comprises, a vehicle's electrical system.

5. An automotive vehicle safety signaling light system set forth in claim 1 wherein said means for selective illumination of some of said lighting assemblies responsive to non-linear switching input comprises, a plurality of single source illumination lighting assemblies.

6. A vehicle safety signaling light system comprising the method steps of,
    a. forming a visually distinctive lighting display from a plurality of individual lighting assemblies,
    b. positioning distinctive lamps in groups of three within each of said individual lighting assemblies wherein effective lamps projection paths overlap each other,
    c. positioning a single diffusion lens over each of said distinctive lamp groups within said individual lighting assemblies,
    d. selectively controlling a single visually distinguishable lamp in some of said lighting assemblies,
    e. repeatedly illuminating said lamp of step "d" in a pre-determined sequence of varying colors and intensity to indicate a change in vehicle status as related to control input of speed,
    f. selecting distinguishable distinctive lamps within each of said lighting assemblies to illuminate simultaneously to define colors not preset in said distinguished distinctive lamps,
    g. positioning pressure responsive electrical switching devices on a vehicle's speed control input assemblies,
    h. illuminating selective tamps in each of said lighting assemblies in response to input from said pressure responsive electrical switches,
    i. it aligning multiple lighting assemblies into responsive groups corresponding to pre-determined positions on the safety signal lighting system,
    j. positing said electrical light displays on a rear portion of said vehicle,
    k. providing a router/controller in communication with said respective lamps in said respective lighting assemblies to illuminate groups of lamps to define visual distinctive color lamp output other than that the lamp's primary distinctive color.

* * * * *